United States Patent
Niu et al.

(10) Patent No.: US 10,178,631 B2
(45) Date of Patent: Jan. 8, 2019

(54) METHOD IMPLEMENTED IN MCE FOR PERFORMING DOWNLINK POWER CONTROL FOR MULTICAST OR BROADCAST SERVICE AND ASSOCIATED MCE

(71) Applicant: Telefonaktiebolaget LM Ericsson (publ), Stockholm (SE)

(72) Inventors: Yanchao Niu, Beijing (CN); Shuang Zhao, Beijing (CN); Jiying Huang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 11 days.

(21) Appl. No.: 15/325,834

(22) PCT Filed: Aug. 1, 2014

(86) PCT No.: PCT/CN2014/083556
§ 371 (c)(1),
(2) Date: Jan. 12, 2017

(87) PCT Pub. No.: WO2016/015335
PCT Pub. Date: Feb. 4, 2016

(65) Prior Publication Data
US 2017/0164302 A1 Jun. 8, 2017

(51) Int. Cl.
*H04H 20/71* (2008.01)
*H04W 52/32* (2009.01)
(Continued)

(52) U.S. Cl.
CPC ........... *H04W 52/327* (2013.01); *H04W 4/06* (2013.01); *H04W 52/143* (2013.01); *H04W 52/322* (2013.01); *H04L 12/189* (2013.01)

(58) Field of Classification Search
CPC ... H04W 52/327; H04W 4/06; H04W 52/143; H04W 52/322
See application file for complete search history.

(56) References Cited

U.S. PATENT DOCUMENTS 9,788,328 B2 * 10/2017 Tavildar ............. H04W 72/082
2005/0143118 A1 * 6/2005 Bernhardsson ....... H04W 52/14
455/522
(Continued)

FOREIGN PATENT DOCUMENTS

| CN | 103118334 A | 5/2013 |
|---|---|---|
| CN | 103118338 A | 5/2013 |
| CN | 103118423 A | 5/2013 |

OTHER PUBLICATIONS

Author Unknown, "Technical Specification Group Services and System Aspects; Multimedia Broadcast/Multicast Service (MBMS); Stage 1 (Release 11)," Technical Specification 22.146, Version 11.1.0, 3GPP Organizational Partners, May 2013, 18 pages.
(Continued)

*Primary Examiner* — Abdelnabi O Musa
(74) *Attorney, Agent, or Firm* — Patent Portfolio Builders, PLLC (57) ABSTRACT

The present disclosure provides a method implemented in an MCE for performing downlink power control for a multicast or broadcast service which is collectively provided from a number of radio base stations to a number of terminal devices. The method comprises collecting path-loss attenuations between the radio base stations and all or a subset of the terminal devices. The method further comprises calculating transmission powers for the radio base stations based on the collected path-loss attenuations, such that a sum of the transmission powers is minimized under a set of constraints on reception powers at said all or said subset of the terminal devices. Each of the radio base stations is notified
(Continued)

of a corresponding one of the calculated transmission powers. The present disclosure also provides an MCE for performing downlink power control for a multicast or broadcast service.

16 Claims, 5 Drawing Sheets

(51) Int. Cl.
*H04W 52/14* (2009.01)
*H04W 4/06* (2009.01)
*H04L 12/18* (2006.01)

(56) References Cited

U.S. PATENT DOCUMENTS

| | | | | |
|---|---|---|---|---|
| 2012/0322494 | A1* | 12/2012 | Zhou | H04W 36/30 455/522 |
| 2013/0114498 | A1* | 5/2013 | Park | H04W 4/06 370/312 |
| 2013/0194953 | A1 | 8/2013 | Xu et al. | |
| 2013/0244715 | A1* | 9/2013 | Kwon | H04W 52/242 455/522 |
| 2013/0272233 | A1* | 10/2013 | Dinan | H04W 72/0406 370/329 |
| 2014/0086173 | A1 | 3/2014 | Sadeghi et al. | |
| 2014/0146750 | A1* | 5/2014 | Kim | H04W 52/146 370/328 |
| 2015/0341872 | A1* | 11/2015 | Ryu | H04L 43/04 370/350 |

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.2.0, 3GPP Organizational Partners, Jun. 2014, 215 pages.

Author Unknown, "Technical Specification Group Radio Access Network; Evolved Universal Terrestrial Radio Access Network (E-UTRAN); General aspects and principles for interfaces supporting Multimedia Broadcast Multicast Service (MBMS) within E-UTRAN (Release 11)," Technical Specification 36.440, Version 11.2.0, 3GPP Organizational Partners, Mar. 2013, 12 pages.

International Search Report and Written Opinion for International Patent Application No. PCT/CN2014/083556, dated May 4, 2015, 11 pages.

Carlà, Lorenzo et al., "Power Efficient Resource Allocation Strategies for Layered Video Delivery over eMBMS Networks," IEEE International Conference on Communications (ICC), Selected Areas in Communications Symposium, Jun. 10-14, 2014, pp. 3505-3510, Sydney, Australia.

Extended European Search Report for European Patent Application No. 14898772.0, dated Dec. 18, 2017, 8 pages.

* cited by examiner

METHOD IMPLEMENTED IN MCE FOR PERFORMING DOWNLINK POWER CONTROL FOR MULTICAST OR BROADCAST SERVICE AND ASSOCIATED MCE

This application is a 35 U.S.C. § 371 national phase filing of International Application No. PCT/CN2014/083556, filed Aug. 1, 2014, the disclosure of which is incorporated herein by reference in its entirety.

TECHNICAL FIELD

The present disclosure generally relates to the technical field of wireless communications, and particularly, to a method implemented in a Multicast Coordination Entity (MCE) as well as the MCE for performing downlink power control for a multicast or broadcast service which is collectively provided from a number of radio base stations to a number of terminal devices.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Due to the popularization of advanced wireless terminal devices (such as smart phones, tablets and laptops), demands for data-hungry, multimedia services in wireless communication networks have been increasing significantly.

In such a context, the so-called Evolved Multimedia Broadcast Multicast Service (E-MBMS), which is evolved from the MBMS proposed for Universal mobile telecommunication system Terrestrial Radio Access Network (UTRAN), has been introduced in Release 8 of the 3$^{rd}$ Generation Partnership Project (3GPP) Long Term Evolution (LTE) standards for delivering the same multimedia contents simultaneously from multiple eNodeBs within a Multimedia Broadcast multicast service Single Frequency Network (MBSFN) area to multiple user equipments (UEs) within the area.

Figure 1:
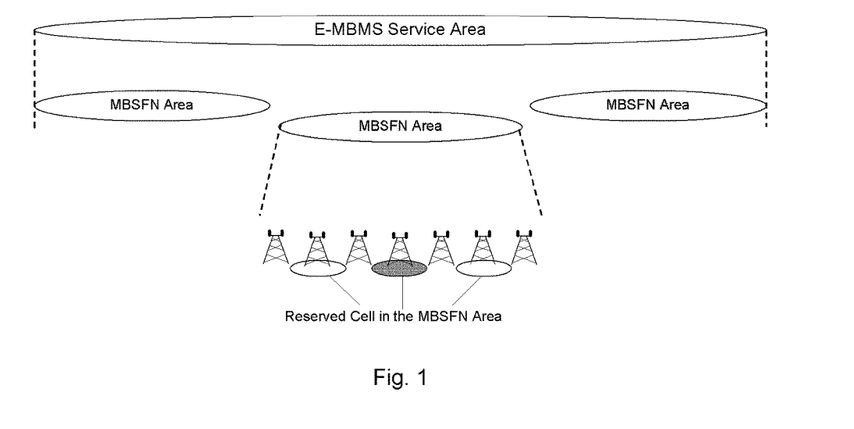
FIG. 1 is a schematic diagram illustrating an E-MBMS service area which is divided into multiple MBSFN areas.

By way of example, FIG. 1 illustrates an E-MBMS service area, which can be divided into multiple MBSFN areas. In each of the MBSFN areas, there are deployed multiple eNodeBs, all of which can be synchronized to perform MBSFN transmission, that is, to transmit the same multimedia contents simultaneously to multiple UEs within the MBSFN area as mentioned above. In practical implementation, some of the eNodeBs within the MBSFN area may be reserved for other purposes than to perform MBSFN transmission. In FIG. 1, these reserved to eNodeBs are also illustrated.

Figure 2:
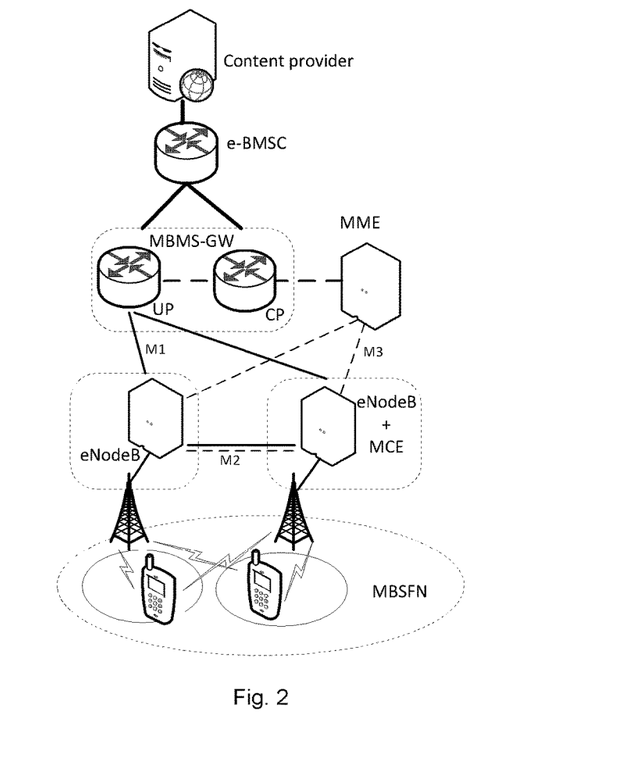
FIG. 2 is a schematic diagram illustrating an exemplary E-MBMS network architecture specified by 3GPP.

FIG. 2 schematically illustrates an exemplary E-MBMS network architecture specified by 3GPP. Being compatible with Evolved Packet System (EPS) networks, the illustrated network architecture comprises two additional logical network entities: Multi-cell/Multicast Coordination Entity (MCE) and MBMS Gateway (GW).

The MCE is responsible for allocation of time and frequency resources for multi-cell E-MBMS transmission and ensures that the same resource block is allocated for a given E-MBMS service to all eNodeBs within a given MBSFN area. That is, the task of the MCE is to appropriately configure the Radio Link Control (RLC)/Medium Access Control (MAC) layers at the eNodeBs so as to enable the eNodeBs to perform MBSFN transmission. The MCE may be integrated in at least one of the eNodes as illustrated in FIG. 2. Alternatively, the MCE may be implemented as an individual network entity separate from the eNodeBs.

The MBMS GW is placed between an Evolved Broadcast Multicast Service Centre (E-BMSC) and eNodeBs and is mainly responsible for forwarding E-MBMS packets from the E-BMSC to all eNodeBs performing MBSFN transmission. By means of Internet Protocol (IP) multicast, the MBMS GW directly forwards E-MBMS user data to the eNodeBs. On the other hand, it performs E-MBMS session control signaling (such as SESSION START/STOP) towards the Evolved-UTRAN (E-UTRAN) via a Mobility Management Entity (MME).

Accordingly, between the MBMS GW and each of the eNodeBs, there lies an M1 interface which is a pure user plane interface and thus no control plane application part is defined therefor. Via the M1 interface, point-to-multipoint delivery of user packets from the MBMS GW to the eNodeBs is performed by means of the IP multicast as mentioned above.

Between the MME and the MCE, there lies an M3 interface, for which an application part is defined to allow for E-MBMS session control signaling (including, for example, E-MBMS SESSION START, E-MBMS STOP, etc.) on Enhanced-Radio Access Bear (E-RAB) level (i.e., no radio configuration data for eNodes performing the MBSFN transmission is conveyed). For signaling transport, the Stream Control Transmission Protocol (SCTP) is applied. That means the signaling is transported in point-to-point manner.

In case the MCE is separate from an eNodeB, there lies an M2 interface between the MCE and the eNodeB. For this interface, an application part is defined to convey not only the radio configuration data but also the session control signaling. Also, the SCTP is adopted for point-to-point signaling transport. In case the MCE is integrated in the eNodeB, the M2 interface is replaced by an internal interface inside the eNodeB.

Up to now, no consideration has been given to downlink power control for E-MBMS, which eNodeBs within an MBSFN area collectively provide to multiple UEs within the area by performing MBSFN transmission. Instead, the eNodeBs typically perform the MBSFN transmission using constant transmission powers.

Figure 3:
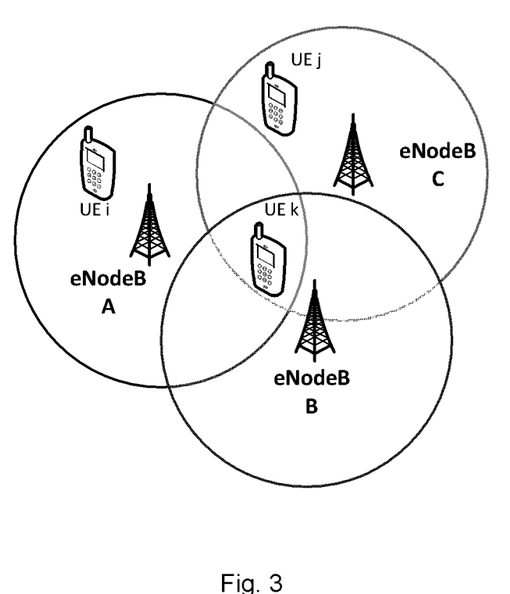
FIG. 3 depicts a scenario where eNodeBs A, B and C collectively provide E-MBMS to UEs i, j and k by performing MBSFN transmissions using constant transmission powers.

As an example of the application of the typical MBSFN transmission scheme, FIG. 3 depicts a scenario where eNodeBs A, B and C collectively provide E-MBMS to UEs i, j and k by performing MBSFN transmissions using constant transmission powers. As illustrated, UE k receives all transmissions of E-MBMS from eNodeBs A, B and C, and UEs i and j receive transmissions of E-MBMS from eNodeBs A and C respectively.

In such a scenario, the transmission powers from eNodes A and C received at the UE k may be adequate for it to be served with the E-MBMS, while UEs i and j receive adequate transmission powers from eNodeBs A and B respectively. Accordingly, it is energy inefficient to keep eNodeB B broadcasting E-MBMS with a constant transmission power.

SUMMARY

An object of the present disclosure is to improve the energy efficiency of the prior art MBSFN transmission scheme by performing downlink power control for a multicast or broadcast service which is collectively provided by two or more radio base stations, such as MBSFN transmission.

According to a first aspect of the present disclosure, there is provided a method implemented in an MCE for performing downlink power control for a multicast or broadcast service which is collectively provided from a number (N≥2) of radio base stations ($BS_i$, i=1, ..., N) to a number (M≥2) of terminal devices ($UE_j$, j=1, ..., M). The method comprises collecting path-loss attenuations ($c_{ji}$, i=1, ..., N; j=1, ..., m (m≤M)) between the radio base stations ($BS_i$, i=1, ..., N) and all or a subset of the terminal devices ($UE_j$, j=1, ..., m (m≤M)). The method further comprises calculating transmission powers ($P_{Ti}^{mbsfn}$, i=1, ..., N) for the radio base stations ($BS_i$, i=1, ..., N) based on the collected path-loss attenuations ($c_{ji}$, i=1, ..., N; j=1, ..., m), such that a sum of the transmission powers $$\left(\sum_{i=1}^{N} P_{Ti}^{mbsfn}\right)$$

is minimized under a set of constraints on reception powers at said all or said subset of the terminal devices ($UE_j$, j=1, ..., m (m≤M)). Each of the radio base stations ($BS_i$, i=1, ..., N) is notified of a corresponding one of the calculated transmission powers ($P_{Ti}^{mbsfn}$, i=1, ..., N).

According to a second aspect of the present disclosure, there is provided an MCE for performing downlink power control for a multicast or broadcast service which is collectively provided from a number (N≥2) of radio base stations ($BS_i$, i=1, ..., N) to a number (M≥2) of terminal devices ($UE_j$, j=1, ..., M). The MCE comprises a collection section, a calculation section and a notification section. The collection section is configured to collect path-loss attenuations ($c_{ji}$, i=1, ..., N; j=1, ..., m (m≤M)) between the radio base stations ($BS_i$, i=1, ..., N) and all or a subset of the terminal devices ($UE_j$, j=1, ..., m (m≤M)). The calculation section is configured to calculate transmission powers ($P_{Ti}^{mbsfn}$, i=1, ..., N) for the radio base stations ($BS_i$, i=1, ..., N) based on the collected path-loss attenuations ($c_{ji}$, i=1, ..., N; j=1, ..., m), such that a sum of the transmission powers $$\left(\sum_{i=1}^{N} P_{Ti}^{mbsfn}\right)$$

is minimized under a set of constraints on reception powers at said all or said subset of the terminal devices ($UE_j$, j=1, ..., m (m≤M)). The notification section is configured to notify each of the radio base stations ($BS_i$, i=1, ..., N) of a corresponding one of the calculated transmission powers ($P_{Ti}^{mbsfn}$, i=1, ..., N).

By using the method and the MCE according to the first and the second aspects of the present disclosure, the multicast or broadcast service can be collectively provided from the radio base stations to the terminal devices with a minimized or at least largely reduced sum of transmission powers, thereby improving energy efficiency significantly.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Note that although terminology commonly used to describe LTE technology, as standardized by the 3GPP, is used in this disclosure to exemplify the embodiments, this should not be seen as limiting the scope of the techniques to only the aforementioned system. Other wireless systems may also benefit from exploiting the ideas covered within this disclosure. Thus, terms like "eNodeB" and "UE" as used herein should be understood to refer more broadly to radio base stations (or radio access nodes) and terminal devices, respectively, where "terminal device" should be understood to encompass not only end-user wireless devices designed to be used by human beings for wirelessly communicating voice and/or data (such as mobile telephones, smartphones, wireless-enabled tablets or personal computers, and the like) but also end-application wireless devices enabled to wirelessly communicate data without human involvement (such as wireless machine-to-machine units, and the like). Accordingly, the disclosed downlink power control solutions are applicable to not only E-MBMS which is collectively provided from multiple eNodeBs to multiple UEs but also any other multicast or broadcast service which is collectively provided from multiple radio base stations to multiple terminal devices.

As mentioned above, the main objective of downlink power control for a multicast or broadcast service, which is collectively provided from a number (N≥2) of radio base stations ($BS_i$, i=1, ..., N) to a number (M≥2) of terminal devices ($UE_j$, j=1, ..., M), is to minimize the sum of the transmission powers of the radio base stations while ensuring that the reception power at each of the UEs is adequate for the UE to be served with the multicast or broadcast service.

Mathematically, such an objective may be expressed as the following optimization problem $$\min \Sigma_{i=1}^{N} P_{Ti}^{mbsfn} \quad (1)$$

subject to the constraints as follows $$U_{R_j} = \sum_{i=1}^{N} U_{R_{ji}} = \sum_{i=1}^{N} c_{ji} \times P_{Ti}^{mbsfn} \geq \gamma \quad j=1, \ldots, M \quad (2)$$

where
  i is an index identifying one of the radio base stations, denoted as $BS_i$;
  j is an index identifying one of the terminal devices, denoted as $UE_j$;
  $P_{Ti}^{mbsfn}$ denotes a transmission power at which the radio base station $BS_i$ supplies the multicast or broadcast service;
  $U_{R_j}$ denotes a total reception power measured at the terminal device $UE_j$ for the service signals transmitted from all the radio base stations;
  $U_{R_{ji}}$ denotes an individual reception power measured at the terminal device $UE_j$ for the individual service signal transmitted from the radio base station $BS_i$;
  $c_{ji}$ denotes a path-loss attenuation between the radio base station $BS_i$ and the terminal device $UE_j$; and
  γ denotes a threshold adequate for each of the terminal devices to be served with the multicast or broadcast service.

Supposing the radio base stations are power limited, the above-described optimization problem shall be solved subject to an additional constraint as follows $$P_{Ti}^{mbsfn} \in [0, P_{Ti}^{max}] \quad (3)$$

where $P_{Ti}^{max}$ denotes the maximum allowable transmission power for the radio base station $BS_i$ to supply the multicast or broadcast service.

In an embodiment, the path-loss attenuation $c_{ji}$ between the radio base station $BS_i$ and the terminal device $UE_j$ may be determined at the radio base station $BS_i$ based on a transmission power of a Cell-Specific Reference, CSR, signal transmitted from the radio base station $BS_i$ and the CSR signal reception power measured at and reported from the terminal device $UE_j$.

By way of example, the path-loss attenuation $c_{ji}$ may be calculated as a ratio as follows $$c_{ji} = \frac{U_{ji}^{CRS}}{P_i^{CRS}} \quad (4)$$

where $P_i^{CRS}$ denotes the transmission power of the CSR signal transmitted from the radio base station $BS_i$ and $U_{ji}^{CRS}$ denotes the reception power measured at the terminal device $UE_j$ for the CSR signal.

Alternatively, the path-loss attenuation $c_{ji}$ may be estimated from a distance between the radio base station $BS_i$ and the terminal device $UE_j$ according to an appropriate propagation channel model.

In an embodiment, the path-loss attenuation $c_{ji}$ between the terminal device $UE_j$ and the radio base station $BS_i$ may be determined to be zero, if the CSR signal reception power measured at the $UE_j$ is not larger than a threshold Φ. In this manner, the above formula (2) can be simplified by ignoring one or more zero-valued terms $c_{ji} \times P_{Ti}^{mbsfn}$ in the formula, and the computational complexity in solving the above-described optimization problem can be reduced accordingly.

Additionally, the terminal device $UE_j$ may be configured not to report the measured CSR signal reception power to the radio base station $BS_i$, if the measured CSR signal reception power is not larger than the threshold Φ. As such, the reports of the measured CSR signal reception powers from one terminal device to its remote radio base stations can be avoided, and the uplink radio resources consumed by the reports can be saved accordingly.

In an embodiment, the computational complexity in solving the above-described optimization problem can be further reduced by reducing the number of the constraints characterized by the above formula (2).

Figure 4:
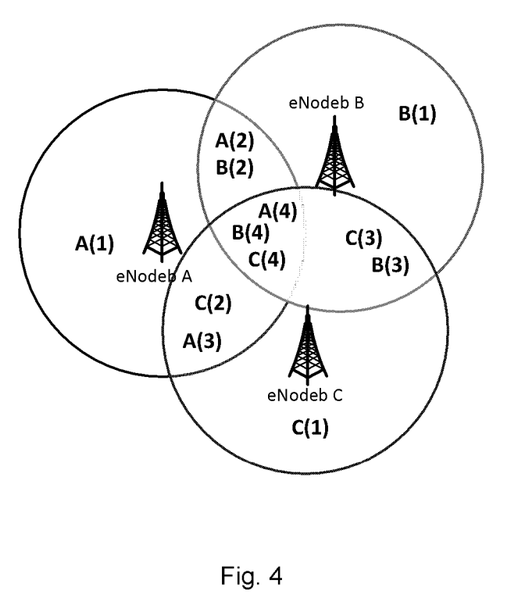
FIG. 4 depicts a scenario where the coverage of each of the eNodeBs A, B and C is divided into four sub-regions.

To explain the principle of such a scheme, the coverage of eNodeB A shown in FIG. 3 is divided into four sub-regions labeled as A(1), A(2), A(3), A(4), as illustrated in FIG. 4. For each of the sub-regions, the UE receiving the minimum CSR signal reception power from eNodeB A might be selected as a representative UE. As long as the E-MBMS reception power at the representative UE is adequate for it to be served with the E-MBMS, any other UE in the same sub-region as the representative UE can also be served with the E-MBMS because the E-MBMS reception power at the other UE is larger than the E-MBMS reception power at the representative UE. Thus, the number of constraints for UEs within the coverage of eNodeB A can be reduced to four, no matter how many UEs are actually located within eNodeB A's coverage.

Accordingly, only path-loss attenuations $c_{ji}$ (i=1, . . . , N; j=1, . . . , m (m<M)) between the radio base stations ($BS_i$, i=1, . . . , N) and a subset of the terminal devices ($UE_j$, j=1, . . . , m (m<M)) are needed for solving the objective optimization problem.

The subset of the terminal devices ($UE_j$, j=1, . . . , m) may include representative terminal devices, each of which is selected from each group of terminal devices within a coverage of each of the radio base stations ($BS_i$, i=1, . . . , N) such that the path-loss attenuation between the respective radio base station and the respective representative terminal device is the minimum one of non-zero path-loss attenuations between the respective radio base station and the respective group of terminal devices within the coverage of the respective radio base station.

The respective group of terminal devices within the coverage of the respective radio base station is associated with a subset of the radio base stations ($BS_i$, i∈Λ), and the path-loss attenuation between each terminal device in the respective group of terminal devices and each radio base station in the subset of the radio base stations is not zero.

In the following, Table 1 is given as an example to illustrate how to select representative terminal devices from terminal devices within the coverage of eNodeB i. As shown in column 2 of Table 1, the terminal devices within eNodeB i's coverage include $u_1$, $u_2$, $u_3$, $u_4$, $u_5$. In column 3 of Table 1, the path-loss attenuations between these UEs and eNodeB i are indicated, where $c_{u_j i}$ denotes a non-zero path-loss attenuation between $u_j$ and eNodeB i. Likewise, in columns 4 and 5 of the table, the path-loss attenuations between the UEs and eNodeBs j and k are indicated, respectively.

TABLE 1

| UE groups | UE | eNodeB i | eNodeB j | eNodeB k |
|---|---|---|---|---|
| Group 1 | $u_1$ | $c_{u_1 i}$ | 0 | 0 |
|  | $u_2$ | $c_{u_2 i}$ | 0 | 0 |
| Group 2 | $u_3$ | $c_{u_3 i}$ | $c_{u_3 j}$ | 0 |
| Group 3 | $u_4$ | $c_{u_4 i}$ | $c_{u_4 j}$ | $c_{u_4 k}$ |
|  | $u_5$ | $c_{u_5 i}$ | $c_{u_5 j}$ | $c_{u_5 k}$ |

As the path-loss attenuation between each of $u_1$ and $u_2$ and eNodeB i is not zero, $u_1$ and $u_2$ are grouped into group 1 associated with eNodeB i. As the path-loss attenuation between $u_3$ and each of eNodeBs i and j is not zero, $u_3$ is grouped into group 2 associated with eNodeBs i and j. As the path-loss attenuation between each of $u_4$ and $u_5$ and each of eNodeBs i, j and k is not zero, $u_4$ and $u_5$ are grouped into group 3 associated with eNodeBs i, j and k.

Then, from each group of the UEs, one representative UE is selected, such that the path-loss attenuation between eNodeB i and the representative UE is minimum one of non-zero path-loss attenuations between eNodeB i and the group of UEs. For example, if $c_{u_4 i}$ is smaller than $c_{u_5 i}$, $u_4$ will be selected from group 3 as the representative terminal device.

In practical implementation, a table like the above Table 1 may be created and maintained in an MCE for each of multiple radio base stations, which collectively provide a multicast or broadcast service to multiple terminal devices. To do this, the MCE needs to collect, from the radio base stations, path-loss attenuations between the radio base stations and all of the terminal devices. Then, the MCE can solve the objective optimization problem under a reduced number of constraints.

Alternatively, a table like the above Table 1 may be created and maintained in a corresponding radio base station (for example, Table 1 is created in eNodeB i). In this case, the radio base station only needs to send path-loss attenuations related to representative terminal devices within its coverage to the MCE, which then solves the objective optimization problem under a reduced number of constraints. That is, the MCE just collects path-loss attenuations between the radio base stations and the subset of the terminal devices.

Figure 5:
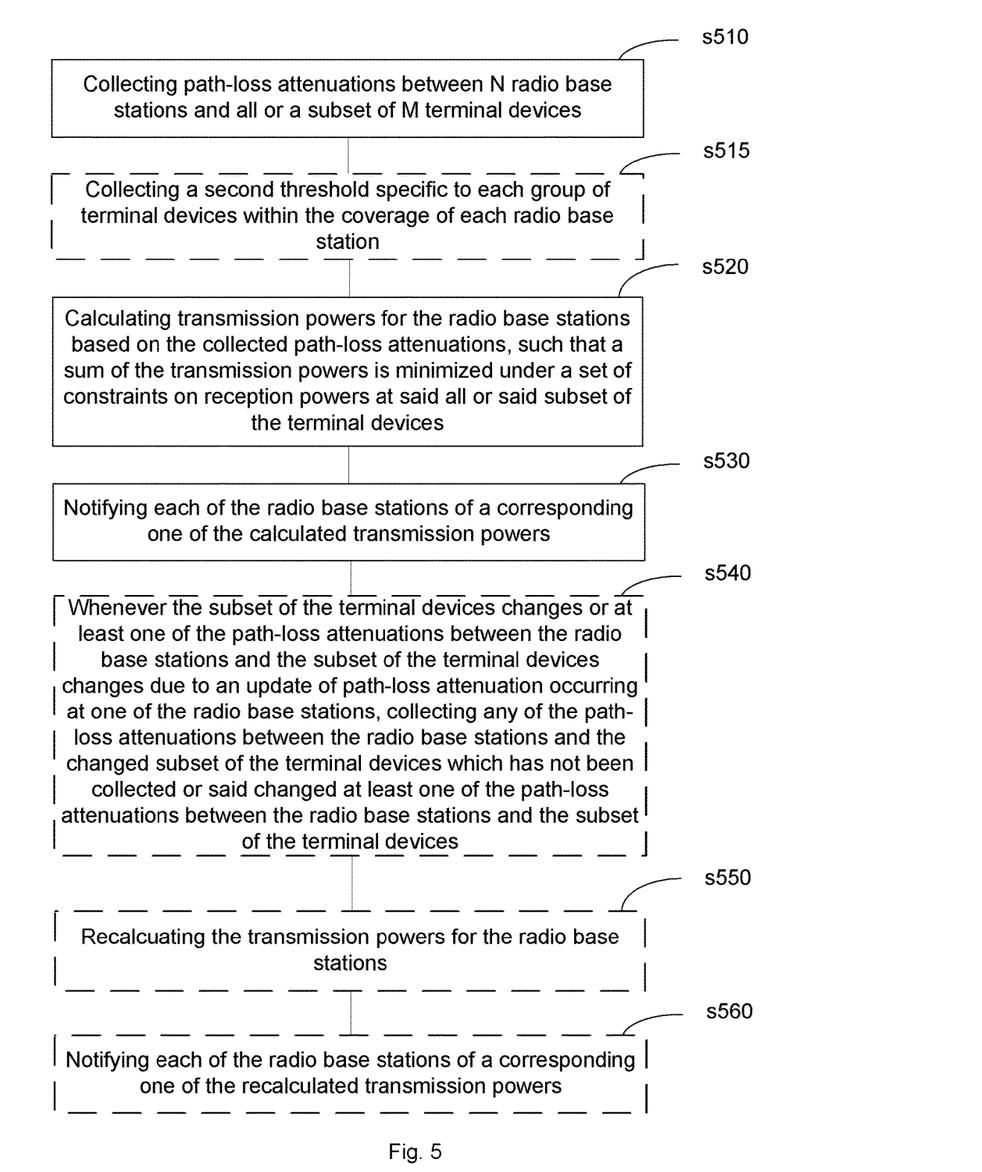
FIG. 5 is a flow chart illustrating a method for performing downlink power control for a multicast or broadcast service which is collectively provided from more than one radio base stations to more than one terminal devices according to the present disclosure.

As a summary of the above discussion, FIG. 5 schematically illustrates a method 500 implemented in an MCE for performing downlink power control for a multicast or broadcast service according to the present disclosure, wherein the multicast or broadcast service is collectively provided from a number (N≥2) of radio base stations ($BS_i$, i=1, . . . , N) to a number (M≥2) of terminal devices ($UE_j$, j=1, . . . , M). As illustrated, initially, the MCE collects path-loss attenuations ($c_{ji}$, i=1, . . . , N; j=1, . . . , m (m≤M)) between the radio base stations ($BS_i$, i=1, . . . , N) and all or a subset of the terminal devices ($UE_j$, j=1, . . . , m (m≤M)) at step s510.

As set forth above for illustration rather than limitation, the path-loss attenuation $c_{ji}$ between the radio base station $BS_i$ and the terminal device $UE_j$ may be determined at the radio base station $BS_i$, based on a transmission power of a CSR signal transmitted from the radio base station $BS_i$ and the CSR signal reception power measured at and reported from the terminal device $UE_j$. The subset of the terminal devices ($UE_j$, j=1, . . . , m) may include representative terminal devices, each of which is selected from each group of terminal devices within a coverage of each of the radio base stations ($BS_i$, i=1, . . . , N).

Then, at step s520, transmission powers ($P_{Ti}^{mbsfn}$, i=1, . . . , N) for the radio base stations ($BS_i$, i=1, . . . , N) are calculated based on the collected path-loss attenuations ($c_{ji}$, i=1, . . . , N; j=1, . . . , m), such that a sum of the transmission powers $$\left(\sum_{i=1}^{N} P_{Ti}^{mbsfn}\right)$$

is minimized under a set of constraints on reception powers at said all or said subset of the terminal devices ($UE_j$, j=1, . . . , m (m≤M)).

By way of illustration rather than limitation, the set of constraints may take the form of formula (2) which is described hereinabove or the form of formula (6) which will be described hereinbelow.

Next, at step s530, each of the radio base stations ($BS_i$, i=1, . . . , N) is notified of a corresponding one of the calculated transmission powers ($P_{Ti}^{mbsfn}$, i=1, . . . , N).

Figure 6:
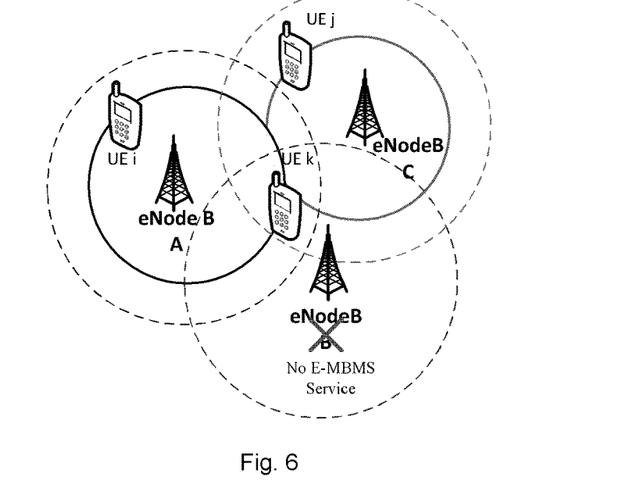
FIG. 6 is a schematic diagram illustrating a result of applying the method of FIG. 5 to a scenario where eNodeBs A, B and C collectively provide E-MBMS to UEs i, j and k.

For illustration, FIG. 6 depicts a result of applying the method 500 to a scenario where eNodeBs A, B and C collectively provide E-MBMS to UEs i, j and k. As compared with the MBSFN transmission scheme shown in FIG. 3, eNodeBs A and C may decrease their transmission powers for E-MBMS, and eNodeB B may even stop its E-MBMS transmission. Accordingly, energy efficiency can be significantly improved.

To avoid consuming too much uplink radio resources and recalculating the transmission powers for the radio base stations too frequently, a terminal device may report to a radio base station a reception power measured for a CSR signal transmitted from the radio base station, only when the measured CSR signal reception power undergoes a change larger than a certain amount and the measured CSR signal reception power after the change is larger than the threshold ($\Phi$) or falls below the threshold ($\Phi$). By way of example, said certain amount may be equal to the CSR signal transmission power ($P_{T_i}^{CRS}$) scaled by a factor specific to the radio base station ($\Delta c_i$). In response to the receipt of the measured CSR signal reception power, an update of path-loss attenuation may occur at the radio base station.

Adaptively, the constraints for calculating the transmission powers for the radio base stations shall be changed as follows $$\sum_{i=1}^{N}(c_{ji}-\Delta c_i)\times P_{T_i}^{mbsfn} \geq \gamma \quad (5)$$

which may be rewritten as $$\sum_{i=1}^{N}c_{ji}\times P_{T_i}^{mbsfn} \geq \sum_{i=1}^{N}\Delta c_i \times P_{T_i}^{mbsfn} + \gamma. \quad (6)$$

From the right side of the above inequality, a new threshold $\Gamma$ may be defined for each group of terminal devices within the coverage of each of the radio base stations ($BS_i$, i=1, ..., N) as follows $$\sum_{i=1}^{N}\Delta c_i \times P_{T_i}^{mbsfn} + \gamma = \sum_{i=1,i\in\Lambda}^{N}\Delta c_i \times P_{T_i}^{mbsfn} + \gamma \leq \sum_{i=1,i\in\Lambda}^{N}\Delta c_i \times P_{T_i}^{max} + \gamma = \Gamma \quad (7)$$

where $\Lambda$ denotes a subset of the radio base stations with which the group of terminal devices is associated, and $P_{T_i}^{max}$ denotes the maximum transmission power of each radio base station in the subset of the radio base stations ($BS_i$, $i\in\Lambda$).

By way of example, the above Table 1 may be extended as the following Table 2, where thresholds $\Gamma_1$, $\Gamma_2$ and $\Gamma_3$ are additionally indicated respectively for UE groups 1, 2 and 3 within eNodeB i's coverage.

TABLE 2

| UE groups | UE | Threshold | eNodeB i | eNodeB j | eNodeB k |
| --- | --- | --- | --- | --- | --- |
| Group 1 | $u_1$ | $\Gamma_1$ | $c_{u_1 i}$ | 0 | 0 |
| | $u_2$ | $\Gamma_1$ | $c_{u_2 i}$ | 0 | 0 |
| Group 2 | $u_3$ | $\Gamma_2$ | $c_{u_3 i}$ | $c_{u_3 j}$ | 0 |
| Group 3 | $u_4$ | $\Gamma_3$ | $c_{u_4 i}$ | $c_{u_4 j}$ | $c_{u_4 k}$ |
| | $u_5$ | $\Gamma_3$ | $c_{u_5 i}$ | $c_{u_5 j}$ | $c_{u_5 k}$ |

Accordingly, the method 500 shown in FIG. 5 may further comprise collecting a threshold $\Gamma$ specific to each group of terminal devices within the coverage of each of the radio base stations, at step s515.

Due to the update of path-loss attenuation occurring at one of the radio base stations ($BS_i$, i=1, ..., N), the subset of the terminal devices ($UE_j$, j=1, ..., m (m<M)) may change or at least one of the path-loss attenuations ($c_{ji}$, i=1, ..., N; j=1, ..., m) between the radio base stations and the subset of the terminal devices may change.

Accordingly, the method 500 shown in FIG. 5 may further comprise steps s540-s560. At step s540, whenever the subset of the terminal devices changes or at least one of the path-loss attenuations between the radio base stations and the subset of the terminal devices changes, any of the path-loss attenuations between the radio base stations and the changed subset of the terminal devices which has not been collected or the changed path-loss attenuation(s) between the radio base stations and the subset of the terminal devices may be collected.

Then, at step s550, the transmission powers may be recalculated for the radio base stations. Next, at step s560, each of the radio base stations may be notified of a corresponding one of the recalculated transmission powers.

Figure 7:
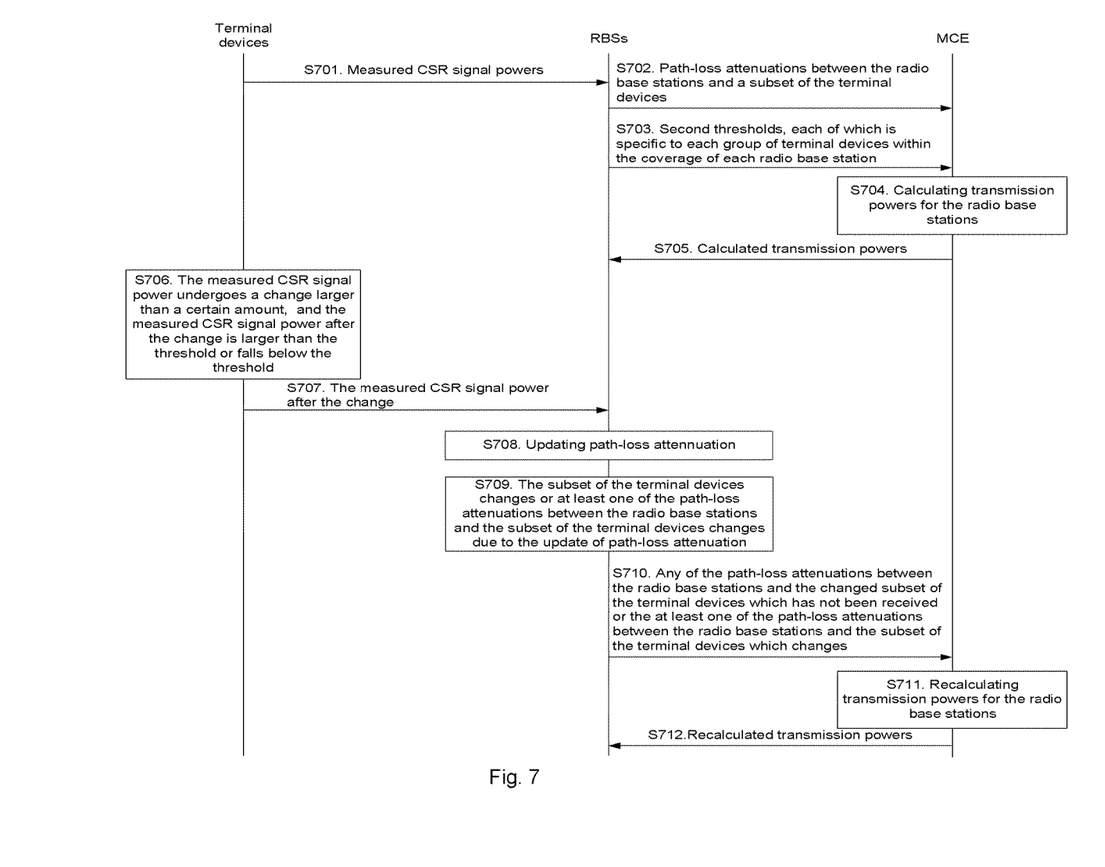
FIG. 7 is sequence diagram illustrating possible operations of as well as possible communications among terminal devices, radio base stations and an MCE which may be performed before and during the execution of the method shown in FIG. 5.

To facilitate a better understanding of the proposed method implemented in an MCE for performing downlink power control for a multicast or broadcast service which is collectively provided from multiple radio base stations to multiple terminal devices, FIG. 7 illustrates possible operations of as well as possible communications among the terminal devices, the radio base stations and the MCE.

It shall be noted that steps related to the MCE shown in FIG. 7 just correspond to the steps shown in FIG. 5 which specifically illustrates the method implemented by the MCE. That is, steps s702, s703, s704, s705, s710, s711 and s712 in FIG. 7 correspond to the steps s510, s515, s520, s530, s540, s550 and s560 in FIG. 5, respectively.

As illustrated, initially, the terminal devices may report measured CSR signal reception powers to the radio base stations from which they receive the CSR signals respectively, at step s701. Based on the reported measured CSR signal reception powers, path-loss attenuations between the radio base stations and the terminal devices may be determined at the radio base stations.

At step s702, the MCE collects path-loss attenuations between the radio base stations and all or a subset of the terminal devices. Optionally, the MCE may collect a second threshold $\Gamma$ specific to each group of terminal devices within the coverage of each of the radio base stations, at step s703.

At step s704, the MCE calculates the transmission powers for the radio base stations based on the collected path-loss attenuations, such that a sum of the transmission powers is minimized under a set of constraints on reception powers at said all or said subset of the terminal devices. Then, at step s705, the MCE notifies each of the radio base stations of a corresponding one of the calculated transmission powers.

At step s706, a reception power measured at one of the terminal devices for a CSR signal transmitted from one of the radio base stations may undergo a change larger than a certain amount and the measured CSR signal reception power after the change may be larger than a threshold $\Phi$ or fall below the threshold $\Phi$. Accordingly, the terminal device may report the measured CSR signal reception power to the radio base station at step s707, and the radio base station may update the path-loss attenuation between the terminal device and itself at step s708.

In case the subset of the terminal devices changes or at least one of the path-loss attenuations between the radio base station and the subset of the terminal devices changes at step s709 due to the update of path-loss attenuation at step s708, the MCE may collect, at step s710, any of the path-loss attenuations between the radio base stations and the changed subset of the terminal devices which has not been collected or the changed path-loss attenuation(s) between the radio base stations and the subset of the terminal devices.

At step s711, the MCE may recalculate the transmission powers for the radio base stations. Then, at step s712, the MCE may notify each of the radio base stations of a corresponding one of the recalculated transmission powers.

Note that the procedure illustrated in FIG. 7 is given for illustration rather than for limitation. Certain operations in the exemplary procedure may be replaced with variants described hereinabove or even omitted as appropriate.

Figure 8:
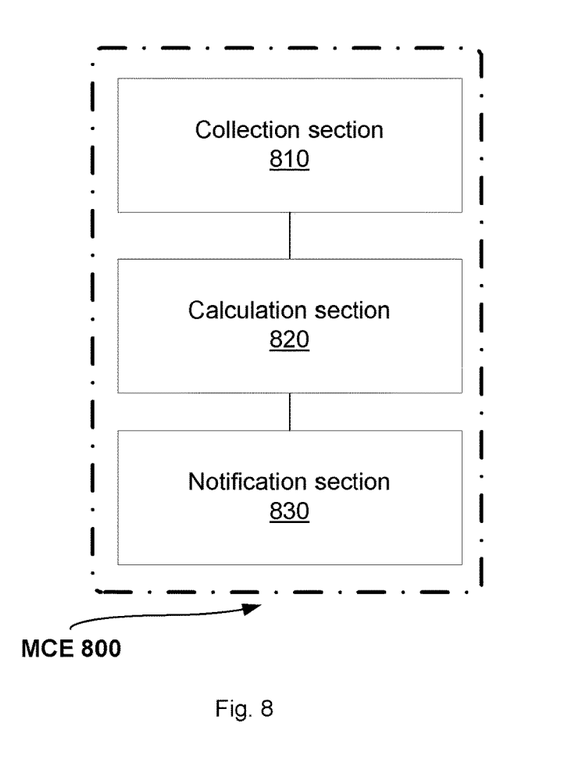
FIG. 8 is a schematic diagram illustrating a structure of an MCE according to the present disclosure.

In the following, a structure of an MCE 800 according to the present disclosure will be described with reference to FIG. 8.

As illustrated, the MCE 800 comprises a collection section 810, a calculation section 820 and a notification section 830. The collection section 810 is configured to collect path-loss attenuations ($c_{ji}$, i=1, . . . , N; j=1, . . . , m (m≤M)) between the radio base stations ($BS_i$, i=1, . . . , N) and all or a subset of the terminal devices ($UE_j$, j=1, . . . , m (m≤M)). The calculation section 820 is configured to calculate transmission powers ($P_{Ti}^{mbsfn}$, i=1, . . . , N) for the radio base stations ($BS_i$, i=1, . . . , N) based on the collected path-loss attenuations ($c_{ji}$, i=1, . . . , N; j=1, . . . , m), such that a sum of the transmission powers $$\left(\sum_{i=1}^{N} P_{Ti}^{mbsfn}\right)$$

is minimized under a set of constraints on reception powers at said all or said subset of the terminal devices ($UE_j$, j=1, . . . , m (m≤M)). The notification section 830 is configured to notify each of the radio base stations ($BS_i$, i=1, . . . , N) of a corresponding one of the calculated transmission powers ($P_{Ti}^{mbsfn}$, i=1, . . . , N).

In an embodiment, a path-loss attenuation between one of the radio base stations ($BS_i$, i=1, . . . , N) and one of the terminal devices ($UE_j$, j=1, . . . , M) may be determined based on a transmission power of a Cell-Specific Reference, CSR, signal transmitted from said one radio base station and the CSR signal reception power measured at said one terminal device. If the measured CSR signal reception power is not larger than a threshold ($\Phi$), the path-loss attenuation between said one terminal device and said one radio base station ($c_{ji}$) may be determined to be zero.

In an embodiment, the subset of the terminal devices ($UE_j$, j=1, . . . , m (m≤M)) may include representative terminal devices, each of which is selected from each group of terminal devices within a coverage of each of the radio base stations ($BS_i$, i=1, . . . , N) such that the path-loss attenuation between the respective radio base station and the representative terminal device is the minimum one of non-zero path-loss attenuations between the respective radio base station and the respective group of terminal devices within the coverage of the respective radio base station. The respective group of terminal devices within the coverage of the respective radio base station is associated with a subset of the radio base stations ($BS_i$, i∈Λ), and the path-loss attenuation between each terminal device in the respective group of terminal devices and each radio base station in the subset of the radio base stations is not zero.

In an embodiment, the set of constraints may stipulate that the reception power at each of said all or said subset of the terminal devices $$\left(\sum_{i=1}^{N} c_{ji} \times P_{Ti}^{mbsfn}, j=1, \ldots, m(m \leq M)\right)$$

is larger than or equal to a first threshold ($\gamma$) adequate for said each terminal device to be served with the multicast or broadcast service.

In an embodiment, the collection section 810 may be further configured to, whenever the subset of the terminal devices changes or at least one of the path-loss attenuations between the radio base stations and the subset of the terminal devices changes due to an update of path-loss attenuation occurring at one of the radio base stations, collect any of the path-loss attenuations between the radio base stations and the subset of the terminal devices which has not been collected or said changed at least one of the path-loss attenuations between the radio base stations and the subset of the terminal devices. The calculation section 820 may be further configured to recalculate the transmission powers for the radio base stations. The notification section 830 may be further configured to notify each of the radio base stations of a corresponding one of the recalculated transmission powers. The update of path-loss attenuation between said one radio base may occur at said one radio base station, in response to determining that a reception power measured at one of the terminal devices for a CSR signal transmitted from said one radio base station undergoes a change larger than the CSR signal transmission power ($P_{Ti}^{CRS}$) scaled by a factor specific to said one radio base station ($\Delta c_i$), and the measured CSR signal reception power after the change is larger than the threshold ($\Phi$) or falls below the threshold ($\Phi$).

In an embodiment, the collection section 810 may be further configured to collect a second threshold ($\Gamma$) specific to the respective group of terminal devices within the coverage of the respective radio base station. The set of constraints may stipulate that the reception power at each of the subset of the terminal devices $$\left(\sum_{i=1}^{N} c_{ji} \times P_{Ti}^{mbsfn}, j=1, \ldots, m(m \leq M)\right)$$

is larger than or equal to the second threshold ($\Gamma$) specific to the respective group of terminal devices, from which said each of the subset of the terminal devices is selected as the representative terminal device. The second threshold ($\Gamma$) specific to the respective group of terminal devices within the coverage of the respective radio base station may be equal to a first threshold ($\gamma$) plus a sum of scaled maximum transmission powers ($P_{Ti}^{max}$, i∈Λ) of the subset of the radio base stations ($BS_i$, i∈Λ), with which the respective group of terminal devices is associated. The scaled maximum transmission powers ($\Delta c_i P_{Ti}^{max}$, i∈Λ) may be the maximum transmission powers ($P_{Ti}^{max}$, i∈Λ) of the subset of the radio base stations ($BS_i$, i∈Λ) scaled respectively by factors specific to the respective radio base stations in the subset of the radio base stations ($\Delta c_i$, i∈Λ).

In an embodiment, the MCE may be separate from the radio base stations or may be integrated in at least one of the radio base stations.

As those skilled in the art will appreciate, the above-described collection section, calculation section and notification section may be implemented separately as suitable dedicated circuits. Nevertheless, these sections can also be implemented using any number of dedicated circuits through functional combination or separation. In some embodiments, these sections may be even combined in a single application specific integrated circuit (ASIC).

As an alternative software-based implementation, the MCE may comprise a memory and a processor (including but not limited to a microprocessor, a microcontroller or a Digital Signal Processor (DSP), etc.) The memory stores machine-readable program code executable by the processor to perform the functions of the above-described sections of the MCE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method implemented in a Multicast Coordination Entity (MCE) for performing downlink power control for a multicast or broadcast service which is collectively provided from a number ($N \geq 2$) of radio base stations ($BS_i$, $i=1, \ldots, N$) to a number ($M \geq 2$) of terminal devices ($UE_j$, $j=1, \ldots, M$), the method comprising:
    collecting path-loss attenuations ($c_{ji}$, $i=1, \ldots, N$; $j=1, \ldots, m$ ($m \leq M$)) between the radio base stations ($BS_i$, $i=1, \ldots, N$) and all or a subset of the terminal devices ($UE_j$, $j=1, \ldots, m$ ($m \leq M$));
    calculating transmission powers ($P_{Ti}^{mbsfn}$, $i=1, \ldots, N$) for the radio base stations ($BS_i$, $i=1, \ldots, N$) based on the collected path-loss attenuations ($c_{ji}$, $i=1, \ldots, N$; $j=1, \ldots, m$), such that a sum of the transmission powers $$\left( \sum_{i=1}^{N} P_{Ti}^{mbsfn} \right)$$

is minimized under a set of constraints on reception powers at said all or said subset of the terminal devices ($UE_j$, $j=1, \ldots, m$ ($m \leq M$)); and
    notifying each of the radio base stations ($BS_i$, $i=1, \ldots, N$) of a corresponding one of the calculated transmission powers ($P_{Ti}^{mbsfn}$, $i=1, \ldots, N$) to perform downlink power control for the multicast or broadcast service,
    where:
    i is an index identifying a radio base station of radio base stations, denoted as $BS_i$;
    j is an index identifying a terminal device of terminal devices, denoted as $UE_j$;
    $P_{Ti}^{mbsfn}$ denotes a transmission power at which a radio base station ($BS_i$) supplies a multicast or broadcast service;
    $c_{ji}$ denotes a path-loss attenuation between a radio base station ($BS_i$) and a terminal device ($UE_j$);
    N is an integer denoting a number of radio base stations;
    M is an integer denoting a number of terminal devices; and
    m is an integer denoting a number of terminal devices in a subset of terminal devices.

2. The method of claim 1, wherein
    a path-loss attenuation between one of the radio base stations ($BS_i$, $i=1, \ldots, N$) and one of the terminal devices ($UE_j$, $j=1, \ldots, M$) is determined based on a transmission power of a Cell-Specific Reference (CSR) signal transmitted from said one radio base station and CSR signal reception power measured at said one terminal device.

3. The method of claim 2, wherein
    when the measured CSR signal reception power is not larger than a threshold ($\phi$), the path-loss attenuation between said one terminal device and said one radio base station ($c_{ji}$) is determined to be zero.

4. The method of claim 3, wherein
    the subset of the terminal devices ($UE_j$, $j=1, \ldots, m$ ($m \leq M$)) includes representative terminal devices, each of which is selected from each group of terminal devices within a coverage of each of the radio base stations ($BS_i$, $i=1, \ldots, N$) such that the path-loss attenuation between the respective radio base station and the respective representative terminal device is the minimum one of non-zero path-loss attenuations between the respective radio base station and the respective group of terminal devices within the coverage of the respective radio base station, and
    wherein the respective group of terminal devices within the coverage of the respective radio base station is associated with a subset ($\Lambda$) of the radio base stations ($BS_i$), and the path-loss attenuation between each terminal device in the respective group of terminal devices and each radio base station in the subset ($\Lambda$) of the radio base stations is not zero.

5. The method of claim 4, further comprising:
    whenever the subset of the terminal devices changes or at least one of the path-loss attenuations between the radio base stations and the subset of the terminal devices changes due to an update of path-loss attenuation occurring at one of the radio base stations,
    collecting any of the path-loss attenuations between the radio base stations and the changed subset of the terminal devices which has not been collected or said changed at least one of path-loss attenuation between the radio base stations and the subset of the terminal devices;
    recalculating the transmission powers for the radio base stations; and
    notifying each of the radio base stations of a corresponding one of the recalculated transmission powers,
    wherein the update of path-loss attenuation occurs at said one radio base station, in response to determining that:
    a reception power measured at one of the terminal devices for the CSR signal transmitted from said one radio base station undergoes a change larger than the CSR signal transmission power ($P_{Ti}^{CRS}$) scaled by a factor ($\Delta c_i$) specific to said one radio base station, and the measured CSR signal reception power after the change is larger than the threshold ($\phi$) or falls below the threshold ($\phi$),
    where $P_{Ti}^{CRS}$ denotes a transmission power of a CSR signal transmitted from a radio base station ($BS_i$).

6. The method of claim 4, further comprising:
    collecting a second threshold ($\Gamma$) specific to the respective group of terminal devices within the coverage of the respective radio base station,
    wherein the set of constraints stipulate that the reception power at each of the subset of the terminal devices $$\left( \sum_{i=1}^{N} c_{ji} \times P_{Ti}^{mbsfn}, j=1, \ldots, m(m < M) \right)$$

is larger than or equal to the second threshold ($\Gamma$) specific to the respective group of terminal devices, from which said each of the subset of the terminal devices is selected as the representative terminal device,
   wherein the second threshold ($\Gamma$) specific to the respective group of terminal devices within the coverage of the respective radio base station is equal to a first threshold ($\gamma$) plus a sum of scaled maximum transmission powers ($\Delta c_i P_{Ti}^{max}$) of the subset ($\Lambda$) of the radio base stations ($BS_i$), with which the respective group of terminal devices is associated, and
   wherein the scaled maximum transmission powers ($\Delta c_i P_{Ti}^{max}$) are the maximum transmission powers ($P_{Ti}^{max}$) of the subset ($\Lambda$) of the radio base stations ($BS_i$) scaled respectively by factors ($\Delta c_i$) specific to the respective radio base stations in the subset ($\Lambda$) of the radio base stations,
   where $P_{Ti}^{max}$ denotes a maximum allowable transmission power for a radio base station ($BS_i$).

7. The method of claim 1, wherein
the set of constraints stipulate that the reception power at each of said all or said subset of the terminal devices $$\left(\sum_{i=1}^{N} c_{ji} \times P_{Ti}^{mbsfn}, j=1, \ldots, m(m \leq M)\right)$$

is larger than or equal to a first threshold ($\gamma$) adequate for said each terminal device to be served with the multicast or broadcast service.

8. The method of claim 1, wherein the MCE is separate from the radio base stations or is integrated in at least one of the radio base stations.

9. A Multicast Coordination Entity (MCE) for performing downlink power control for a multicast or broadcast service which is collectively provided from a number ($N \geq 2$) of radio base stations ($BS_i$, $i=1, \ldots, N$) to a number ($M \geq 2$) of terminal devices ($UE_j$, $j=1, \ldots, M$), the MCE comprising:
   at least one processor; and
   memory storing software instructions executable by the at least one processor, whereby the MCE is operative to:
      collect path-loss attenuations ($c_{ji}$, $i=1, \ldots, N$; $j=1, \ldots, m$ ($m \leq M$)) between the radio base stations ($BS_i$, $i=1, \ldots, N$) and all or a subset of the terminal devices ($UE_j$, $j=1, \ldots, m$ ($m \leq M$));
      calculate transmission powers ($P_{Ti}^{mbsfn}$, $i=1, \ldots, N$) for the radio base stations ($BS_i$, $i=1, \ldots, N$) based on the collected path loss attenuations ($c_{ji}$, $i=1, \ldots, N$; $j=1, \ldots, m$), such that a sum of the transmission powers $$\left(\sum_{i=1}^{N} P_{Ti}^{mbsfn}\right)$$

is minimized under a set of constraints on reception powers at said all or said subset of the terminal devices ($UE_j$, $j=1, \ldots, m$ ($m \leq M$)); and
      notify each of the radio base stations ($BS_i$, $i=1, \ldots, N$) of a corresponding one of the calculated transmission powers ($P_{Ti}^{mbsfn}$, $i=1, \ldots, N$) to perform downlink power control for the multicast or broadcast service,
      where:
         i is an index identifying a radio base station of radio base stations, denoted as $BS_i$;
         j is an index identifying a terminal device of terminal devices, denoted as $UE_j$;
         $P_{Ti}^{mbsfn}$ denotes a transmission power at which a radio base station ($BS_i$) supplies a multicast or broadcast service;
         $c_{ji}$ denotes a path-loss attenuation between a radio base station ($BS_i$) and a terminal device ($UE_j$);
         N is an integer denoting a number of radio base stations;
         M is an integer denoting a number of terminal devices; and
         m is an integer denoting a number of terminal devices in a subset of terminal devices.

10. The MCE of claim 9, wherein
a path-loss attenuation between one of the radio base stations ($BS_i$, $i=1, \ldots, N$) and one of the terminal devices ($UE_j$, $j=1, \ldots, M$) is determined based on a transmission power of a Cell-Specific Reference (CSR) signal transmitted from said one radio base station and CSR signal reception power measured at said one terminal device.

11. The MCE of claim 10, wherein
when the measured CSR signal reception power is not larger than a threshold ($\phi$), the path-loss attenuation between said one terminal device and said one radio base station ($c_{ji}$) is determined to be zero.

12. The MCE of claim 11, wherein
the subset of the terminal devices ($UE_j$, $j=1, \ldots, m$ ($m \leq M$)) includes representative terminal devices, each of which is selected from each group of terminal devices within a coverage of each of the radio base stations ($BS_i$, $i=1, \ldots, N$) such that the path-loss attenuation between the respective radio base station and the representative terminal device is the minimum one of non-zero path-loss attenuations between the respective radio base station and the respective group of terminal devices within the coverage of the respective radio base station, and
wherein the respective group of terminal devices within the coverage of the respective radio base station is associated with a subset ($\Lambda$) of the radio base stations ($BS_i$), and the path-loss attenuation between each terminal device in the respective group of terminal devices and each radio base station in the subset ($\Lambda$) of the radio base stations is not zero.

13. The MCE of claim 12, wherein
the MCE is further configured to: whenever the subset of the terminal devices changes or at least one of the path-loss attenuations between the radio base stations and the subset of the terminal devices changes due to an update of path-loss attenuation occurring at one of the radio base stations, collect any of the path-loss attenuations between the radio base stations and the subset of the terminal devices which has not been collected or said changed at least one of the path-loss attenuations between the radio base stations and the subset of the terminal devices;
recalculate the transmission powers for the radio base stations; and
notify each of the radio base stations of a corresponding one of the recalculated transmission powers, and
wherein the update of path-loss attenuation occurs at said one radio base station, in response to determining that:
   a reception power measured at one of the terminal devices for the CSR signal transmitted from said one radio base station undergoes a change larger than the CSR signal transmission power ($P_{Ti}^{CRS}$) scaled by a factor ($\Delta c_i$) specific to said one radio base station, and the measured CSR signal reception power after the change is larger than the threshold ($\phi$) or falls below the threshold ($\phi$), where $P_{Ti}^{CRS}$ denotes a transmission power of a CSR signal transmitted from a radio base station ($BS_i$).

14. The MCE of claim 12, wherein the MCE is further configured to collect a second threshold ($\Gamma$) specific to the respective group of terminal devices within the coverage of the respective radio base station, wherein the set of constraints stipulate that the reception power at each of the subset of the terminal devices $$\left(\sum_{i=1}^{N} c_{ji} \times P_{Ti}^{mbsfn}, j = 1, \ldots, m(m < M)\right)$$

is larger than or equal to the second threshold ($\Gamma$) specific to the respective group of terminal devices, from which said each of the subset of the terminal devices is selected as the representative terminal device, wherein the second threshold ($\Gamma$) specific to the respective group of terminal devices within the coverage of the respective radio base station is equal to a first threshold ($\gamma$) plus a sum of scaled maximum transmission powers ($\Delta c_i P_{Ti}^{max}$) of the subset ($\Lambda$) of the radio base stations ($BS_i$), with which the respective group of terminal devices is associated, and wherein the scaled maximum transmission powers ($\Delta c_i P_{Ti}^{max}$) are the maximum transmission powers ($P_{Ti}^{max}$) of the subset ($\Lambda$) of the radio base stations ($BS_i$) scaled respectively by factors ($\Delta c_i$) specific to the respective radio base stations in the subset ($\Lambda$) of the radio base stations, wherein $P_{Ti}^{max}$ denotes a maximum allowable transmission power for a radio base station (BSi).

15. The MCE of claim 9, wherein the set of constraints stipulate that the reception power at each of said all or said subset of the terminal devices $$\left(\sum_{i=1}^{N} c_{ji} \times P_{Ti}^{mbsfn}, j = 1, \ldots, m(m \leq M)\right)$$

is larger than or equal to a first threshold ($\gamma$) adequate for said each terminal device to be served with the multicast or broadcast service.

16. The MCE of claim 9, wherein the MCE is separate from the radio base stations or is integrated in at least one of the radio base stations.

* * * * *